J. A. BUTTERWORTH.
ELEVATING TRUCK.
APPLICATION FILED SEPT. 27, 1919.
1,352,426.
Patented Sept. 14, 1920.
2 SHEETS—SHEET 1.
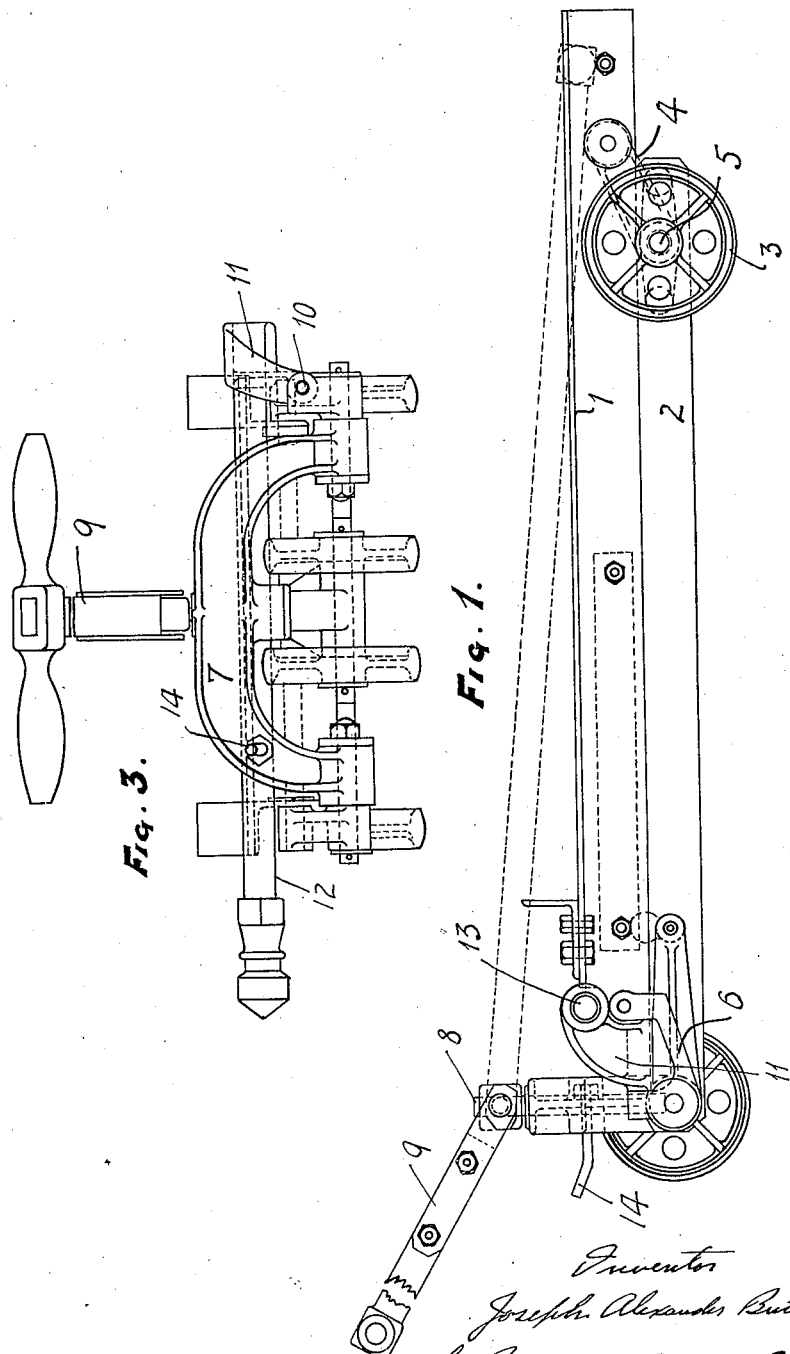

J. A. BUTTERWORTH.
ELEVATING TRUCK.
APPLICATION FILED SEPT. 27, 1919.
1,352,426.
Patented Sept. 14, 1920.
2 SHEETS—SHEET 2.
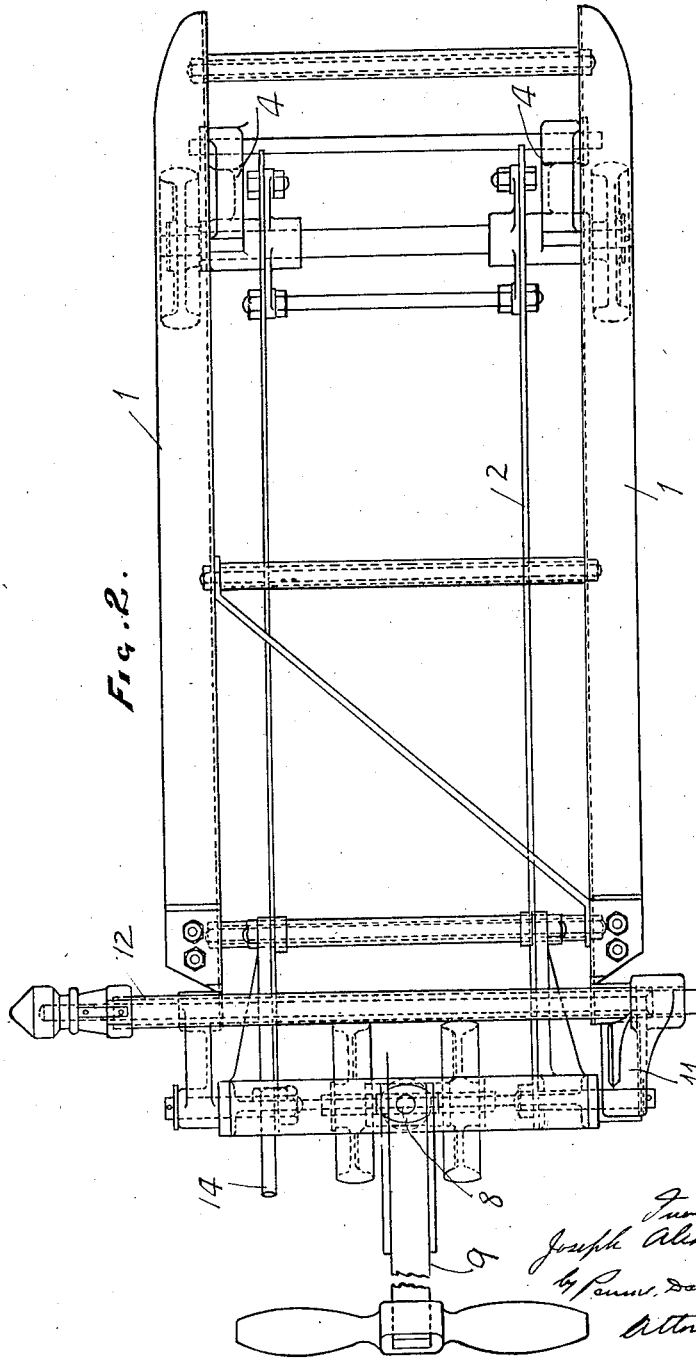

UNITED STATES PATENT OFFICE.

JOSEPH ALEXANDER BUTTERWORTH, OF LOUGHBOROUGH, ENGLAND, ASSIGNOR TO HERBERT MORRIS, LIMITED.

ELEVATING-TRUCK.

1,352,426.

Specification of Letters Patent. Patented Sept. 14, 1920.

Application filed September 27, 1919. Serial No. 326,990.

*To all whom it may concern:*

Be it known that I, JOSEPH ALEXANDER BUTTERWORTH, a subject of the King of the United Kingdom of Great Britain and Ireland, and resident of Loughborough, England, have invented a certain new and useful Improvement in and Relating to Elevating-Trucks, of which the following is a specification.

This invention relates to hand trucks of the type designed for use in machine shops and like places, for raising and transporting loads placed on platforms or the like, the truck being adapted to be introduced beneath the platform, and then elevated to raise the platform or the like with the load, and to transport the platform and load in raised position.

The invention has for an object to provide an improved construction of hand truck of this type which is easily steered and the elevating handle of which both in the lowered and in the elevated positions of the truck can be brought into a position out of the way of the operator.

In accordance with the invention the top frame of the truck, which comprises an under frame mounted on wheels and a top frame adapted to be elevated and to support the load, is mounted at one end on rockers pivoting about the axle of the rear wheels and connected to the top frame and at the front end is supported by rockers connected to a yoke between which the front wheels are mounted on a swivel pin connected with, and operable by, the steering handle. To one of the front rockers is pivoted a lug with the elevating handle fitted at right angles thereto in such manner that in the lowered position of the truck the elevating handle may lie in a horizontal position behind the yoke. By swinging the elevating handle from its position behind the yoke into an upright position in which the pivoted lug assumes a horizontal position and by pulling the handle forward the front rockers and therewith the rear rockers and the top frame are caused to rise. When the front rockers pass beyond the dead center, the elevating handle may be swung back into a horizontal position in front of the yoke, supports being fitted in front of the yoke on which the handle will rest when in this last-named position. In this last-named position of the elevating handle the yoke prevents the handle and therefore the rockers from moving and the top frame from being lowered accidentally.

Preferably the handle is made telescopic so as to afford a greater leverage in elevating and in lowering the top frame.

The invention is illustrated in the accompanying drawing in which Figure 1 is a side elevation, Fig. 2 a plan and Fig. 3 a front view of the improved truck.

As shown, the truck comprises a top frame 1 and an under frame 2. The under frame 2 is mounted on wheels 3 and the top frame 1, which is adapted to be elevated and to support the load, is mounted at one end on rockers 4 pivoting about the axle 5 of the rear wheels and connected to the top frame, and at the front end is supported by rockers 6 connected to a yoke 7 between which the front wheels are mounted on a swivel pin 8 operable by a steering handle 9. To one of the front rockers 6 is pivoted at 10 a lug 11 having an opening 13 in which is fitted the elevating handle 12 so as to extend at right angles thereto. Forwardly of the yoke 7 projects a bracket 14 which serves as a support for the elevating handle in one position thereof.

By moving the elevating handle 12 from its position of rest behind the yoke 7 about its pivots 10 into an upright position and then forwardly the front rockers 6 and therewith the rear rockers 4 and the top frame are caused to rise. When the front rockers 6 pass beyond the dead center the elevating handle may be swung back into horizontal position in front of the yoke 7, being supported in this position on the bracket 14 and being prevented from movement rearwardly by the yoke 7.

As indicated the handle 12 is preferably arranged to telescope so as to afford a greater leverage in elevating and in lowering the top frame and yet occupy little space when in either of its transverse positions.

What I claim is:

1. An elevating truck comprising a wheeled under frame, a top frame, rockers connecting said frames, a lug pivoted to one of said rockers, and an elevating handle fitted to said lug, said handle movable from horizontal position transverse to the truck to vertical position, and from said vertical position to a position longitudinally of the truck whereby to tilt said rockers, and from said position longitudinally of the truck to a horizontal position transverse to said truck.

2. An elevating truck comprising an under frame having front and rear wheels, an upper frame, rockers connecting said frames at one end, a yoke embracing the front wheels of said under frame, rockers connected to said yoke and to said top frame, a lug pivoted to one of said second-named rockers, and an operating handle fitted to said lug, said handle movable from a horizontal position behind said yoke to a second position without movement of said rockers, and movable from said second position to a third position to tilt said rockers, and to elevate said top frame, and from said third position to a fourth position in front of said yoke.

In testimony whereof I have signed my name to this specification in the presence of two subscribing witnesses.

JOSEPH ALEXANDER BUTTERWORTH.

Witnesses:
   Thos. H. Cook,
   H. Mallett.